United States Patent
Devillez et al.

(10) Patent No.: US 10,623,856 B2
(45) Date of Patent: Apr. 14, 2020

(54) SIGNATURE TUNING FILTERS

(71) Applicant: OM AUDIO, LLC, Morgan Hill, CA (US)

(72) Inventors: David Devillez, Morgan Hill, CA (US); James Conrey, San Martin, CA (US)

(73) Assignee: OM AUDIO, LLC, Morgan Hill, CA (US)

( * ) Notice: Subject to any disclaimer, the term of this patent is extended or adjusted under 35 U.S.C. 154(b) by 0 days.

(21) Appl. No.: 16/441,057

(22) Filed: Jun. 14, 2019

(65) Prior Publication Data

US 2019/0297419 A1    Sep. 26, 2019

Related U.S. Application Data

(63) Continuation of application No. 15/036,791, filed as application No. PCT/US2014/065334 on Nov. 13, 2014, now Pat. No. 10,375,476.

(Continued)

(51) Int. Cl.
     *H04R 5/033*      (2006.01)
     *H04R 3/04*      (2006.01)
(Continued)

(52) U.S. Cl.
     CPC ............... *H04R 3/04* (2013.01); *G06F 3/165* (2013.01); *G10L 19/173* (2013.01); *H04S 3/008* (2013.01);
(Continued)

(58) Field of Classification Search
     CPC .......... H04S 1/005; H04S 3/004; H04S 7/304; H04S 2420/03
(Continued)

(56) References Cited

U.S. PATENT DOCUMENTS

2004/0039464 A1    2/2004    Virolainen et al.
2005/0090295 A1    4/2005    Ali et al.
(Continued)

FOREIGN PATENT DOCUMENTS

JP      2010-226322 A    10/2010

OTHER PUBLICATIONS

Devillez et al., Application No. PCT/US2014/065334, Int'l filing date Nov. 13, 2014, Written Opinion dated Feb. 27, 2015.
(Continued)

*Primary Examiner* — George C Monikang
(74) *Attorney, Agent, or Firm* — EcoTech Law Group, P.C.

(57) ABSTRACT

A method of providing audio information, said method comprising: (i) receiving audio filter settings in a client device; (ii) receiving audio data in the client device, wherein the received audio data is in an audio coding format; (iii) converting the audio filter settings to an audio filter signal in a processor of the client device, where the audio filter signal is a time-varying signal; (iv) converting the received audio data to an audio signal in a processor of the client device, where the audio signal is a time-varying signal; and (v) transmitting the converted audio filter signal and the converted audio signal from the client device to an audio output device, where the audio output device is separate from and in communication with the client device, and where the audio output device is configured for modifying the audio signal according to the audio filter signal to generate a time-varying audio output.

7 Claims, 6 Drawing Sheets

Related U.S. Application Data

(60) Provisional application No. 61/903,888, filed on Nov. 13, 2013.

(51) Int. Cl.
   *H04S 7/00*     (2006.01)
   *G06F 3/16*     (2006.01)
   *H04S 3/00*     (2006.01)
   *G10L 19/16*    (2013.01)
   *G10L 19/008*   (2013.01)

(52) U.S. Cl.
   CPC .......... *H04S 7/307* (2013.01); *G10L 19/008* (2013.01); *H04S 2420/03* (2013.01)

(58) Field of Classification Search
   USPC ........................ 381/22, 23, 74, 103
   See application file for complete search history.

(56) References Cited

U.S. PATENT DOCUMENTS

| | | |
|---|---|---|
| 2007/0160250 A1 | 7/2007 | Kuo |
| 2008/0002839 A1 | 1/2008 | Eng |
| 2008/0013752 A1* | 1/2008 | Stephens ............... H03G 5/005 |
| | | 381/103 |
| 2008/0037804 A1 | 2/2008 | Shmunk |
| 2008/0165988 A1 | 7/2008 | Terlizzi et al. |
| 2009/0196445 A1 | 8/2009 | Elmedyb et al. |
| 2010/0062713 A1* | 3/2010 | Blamey ................. H04M 9/082 |
| | | 455/41.3 |
| 2010/0322438 A1 | 12/2010 | Siotis |
| 2011/0125508 A1 | 5/2011 | Kelly et al. |
| 2011/0166866 A1 | 7/2011 | Breebaart |
| 2011/0176688 A1 | 7/2011 | Sugiyama |
| 2013/0034232 A1 | 2/2013 | Lee |
| 2014/0016795 A1* | 1/2014 | Melamed ................. H04R 3/00 |
| | | 381/74 |
| 2014/0153736 A1 | 6/2014 | Chen |

OTHER PUBLICATIONS

Devillez et al., Application No. PCT/US2014/065334, Int'l filing date Nov. 13, 2014, Search Report dated Feb. 27, 2015.
Non-Final Office Action received for U.S. Appl. No. 15/036,791 dated Mar. 23, 2017, 10 pages.
Final Office Action received for U.S. Appl. No. 15/036,791 dated Sep. 22, 2017, 12 pages.
Non-Final Office Action received for U.S. Appl. No. 15/036,791 dated Jul. 6, 2018, 11 pages.
Notice of Allowance received for U.S. Appl. No. 15/036,791 dated Mar. 20, 2019, 11 pages.

* cited by examiner

SIGNATURE TUNING FILTERS

RELATED APPLICATION

This application is a continuation of Ser. No. 15/036,791 with a filing date of May 13, 2016, which claims the benefit from International Application No. PCT/US2014/065334, which was granted an International filing date of Nov. 13, 2014, which in turns claims priority from U.S. provisional application No. 61/903,888, filed Nov. 13, 2013, which are incorporated herein by reference for all purposes.

FIELD OF THE INVENTION

The present teachings generally relate to audio signal processing. More particularly, the present teachings relate to transmitting audio filter settings to an audio output device wherein the audio output device applies the audio filter settings to audio data.

BACKGROUND OF THE INVENTION

The popularity of high-end audio output devices, such as headphones and headsets, has encouraged users to pursue better listening experiences. One method of enhancing the listening experience is to modify the sound produced by an audio output device. This may be accomplished by using an audio filter, which manipulates audio data as it passes through a digital signal processor (hereinafter a "DSP"). Some client devices can apply an audio filter but it is typically limited to preset filters based on a style of music (e.g., rock, pop and classical). In other instances, a client device allows the user to create a user-defined filter, however, limited functionality may restricts the user's ability to manipulate the outgoing sound. Moreover, the user cannot continue to use the filter when the user disconnects the client device from the audio output device. As such, the user cannot continue to use the filter if the user uses another client device In other instances, client devices may use a software application to simulate audio filters. The software application manipulates audio data as the software application plays the audio data rather than manipulating the audio data through a DSP. In certain instances, however, music streaming services may prevent the music content from its services from being manipulated by a third-party software application. This restricts the types of audio content that can be played and filtered through the software application. In addition, the user cannot continue to use the filter when the user disconnects the client device from the audio output device.

Furthermore, many client device manufactures prevent third-party software applications from using any hardware within the client device, such as a DSP. Therefore, there is no way to apply filters to a client device DSP to generate high quality sound on an audio output device.

What is needed, therefore, is the ability to transmit an audio filter to an audio output device, where the filter is capable of being used independent of a client device, for a higher quality listening experience.

SUMMARY OF THE INVENTION

In response to this need, the present invention provides a method of providing audio information, the method comprising: (i) receiving audio filter settings in a client device; (ii) receiving audio data in the client device, wherein the received audio data is in an audio coding format; (iii) converting the audio filter settings to an audio filter signal in a processor of the client device, where the audio filter signal is a time-varying signal; (iv) converting the received audio data to an audio signal in a processor of the client device, where the audio signal is a time-varying signal; and (v) transmitting the converted audio filter signal and the converted audio signal from the client device to an audio output device, where the audio output device is separate from and in communication with the client device, and where the audio output device is configured for modifying the audio signal according to the audio filter signal to generate a time-varying audio output. Transmitting between the client device and the audio output device may include transmitting through a cable connecting the client device and the audio output device.

In one embodiment, receiving audio filter settings in a client device includes receiving a plurality of audio filter settings in the client device, and the method further includes (a) storing the plurality of audio filter settings in the client device, and (b) selecting an audio filter setting from the plurality of audio filter settings, and wherein the converting the audio filter settings to an audio filter signal includes converting the selected audio filter settings. The audio coding format may be chosen from a group comprising MP3, AAC and FLAC.

In one embodiment, the present invention offers a client device for providing information to an audio output device. The client device comprises: (i) an input for accepting audio filter settings and audio data, (ii) a programmable processor, and (iii) an output, where the programmable processor is programmed to: (a) receive audio filter settings in the client device; (b) receive audio data in the client device; and (c) provide the audio filter settings and the audio data from the client device to the output, where the output is connected to an audio output device separate from and in communication with the client device, and where the audio output device is configured for modifying the audio data according to the audio filter settings to generate a continuous audio output.

In certain embodiments, the client device includes computer memory, and where the programmable processor is programmed to: (i) receive a plurality of audio filter settings, (ii) store the plurality of audio filter settings in the computer memory of the client device, and (iii) allow a user to select an audio filter setting from the plurality of audio filter settings for providing to the output. In another embodiment, the audio data is in an audio coding format chosen from a group comprising MP3, AAC, or FLAC.

The present invention also offers a method of filtering audio signal at an audio output device, the method comprising: (i) receiving a combined signal including an audio filter signal and audio signal, where the combined signal is a time-varying signal; and (ii) determining, in a processor of the audio output device, a portion of the combined signal corresponding to the audio filter signal; (iii) converting, in the processor of the audio output device, the portion of the combined signal corresponding to the audio filter signal to audio filter settings; (iv) digitizing the audio signal; and (v) filtering the digitized audio signal according to the converted audio filter settings; and (vi) providing the filtered audio signal to an output of the audio output device.

In the above-mentioned filtering method, the steps of determining the portion of the combined signal corresponding to the audio filter signal further includes: (a) identifying a filter header, which defines the beginning of an audio filter, (b) identifying a filter footer, which defines the end of an audio filter, and (c) determining the portion of the combined signal corresponding to the audio filter signal as the portion between the filter heading and the filter footer. In one embodiment the step of filtering the digitized audio signal according to the converted audio filter settings includes processing the audio filter settings, using a digital signal processor, to create a filter for manipulating the received audio data.

The present invention also offers an audio output device for producing filtered time-varying audio signals, the audio output device comprising: (i) an input for accepting a time-varying signal including encoded audio filter settings and a time-varying audio signal; (ii) decoding electronics adapted to accept and decode the encoded audio filter settings; (iii) a digital signal processor to accept the audio filter settings from the decoding electronics and filter the time-varying audio signal; and (iv) an output to provide the filtered audio signal.

In certain embodiments, the decoding electronics decode Manchester encoded signals and determines a header for the encoded audio filter settings. In another embodiment, the audio output device including electronics to convert encoded audio filter settings to a filter for the digital signal processor to filter the accepted audio data.

In another aspect, the present teachings provide a method of providing audio information, the method comprising: (i) receiving a plurality of audio filter settings in a client device; (ii) storing the received plurality of audio filter settings in a memory of the client device; (iii) receiving audio data in the client device, wherein the received audio data is in an audio coding format; (iv) selecting an audio filter setting from the plurality of stored audio filter settings; and (v) transmitting the selected audio filter settings and the audio data to an audio output device, where the audio output device is separate from and in communication with the client device, and where the audio output device is configured to modify the audio according to the audio filter signal to generate a time-varying audio output.

Transmitting between the client device and the audio output device may include transmitting through a cable connecting the client device and the audio output device. In another embodiment, transmitting between the client device and the audio output device includes transmitting wirelessly. The audio data is in an audio coding format and may be chosen from a group comprising MP3, AAC, or FLAC.

A client device for providing information to an audio output device, the client device comprising: (i) an input for accepting a plurality of audio filter settings and audio data; (ii) memory for storing the plurality of audio filter settings; (iii) a programmable processor, and (iv) an output, where the programmable processor is programmed to: (a) receive audio filter settings in the client device and store the audio filter settings in the memory; (b) receive audio data in the client device; and (c) provide the audio filter settings and the audio data from the client device to the output, where the output is connected to an audio output device separate from and in communication with the client device, and where the audio output device is configured for modifying the audio data according to the audio filter settings to generate a continuous audio output. In once embodiment, the audio data is in an audio coding format and may be chosen from a group comprising MP3, AAC, or FLAC In yet another aspect, the present teachings provide a method of transmitting audio information comprising: (i) accepting audio data in an audio coding format in computer memory; (ii) converting the accepted audio data to a time-varying audio signal; (iii) digitizing the time-varying audio signal; and (iv) applying a digital filter to the digitized time-varying signal to produce filtered digitized audio data.

In one embodiment of the present teachings, the accepting and converting are performed in a client device, and the digitizing and applying a digital filter are performed in an audio output device, where the audio output device is separate from and in communication with the client device. The audio output device is in communication with the client device using time-varying signals or using a digital coding format.

DETAILED DESCRIPTION OF THE PREFERRED EMBODIMENTS

In the following description, numerous specific details are set forth in order to provide a thorough understanding of the present arrangements and teachings. It will be apparent, however, to one skilled in the art that the present arrangements and teachings may be practiced without limitation to some or all of these specific details. In other instances, well-known process steps have not been described in detail in order to not unnecessarily obscure the primary features of the present arrangements and teachings.

The present arrangements generally relate to the modification of audio data by audio processing. Those skilled in the art will understand that there are numerous techniques to manipulate audio data. By way of example, audio processing may use one or more audio filters (e.g., biquad, parametric, semi-parametric, high and low pass and graphical) to modify an audio signal. For ease of understanding, audio filter settings will be used to describe audio processing. However, it should be noted that other audio processing techniques, in addition to audio filter settings, may use the same novel systems and methods, described herein, to modify audio data.

Figure 1:
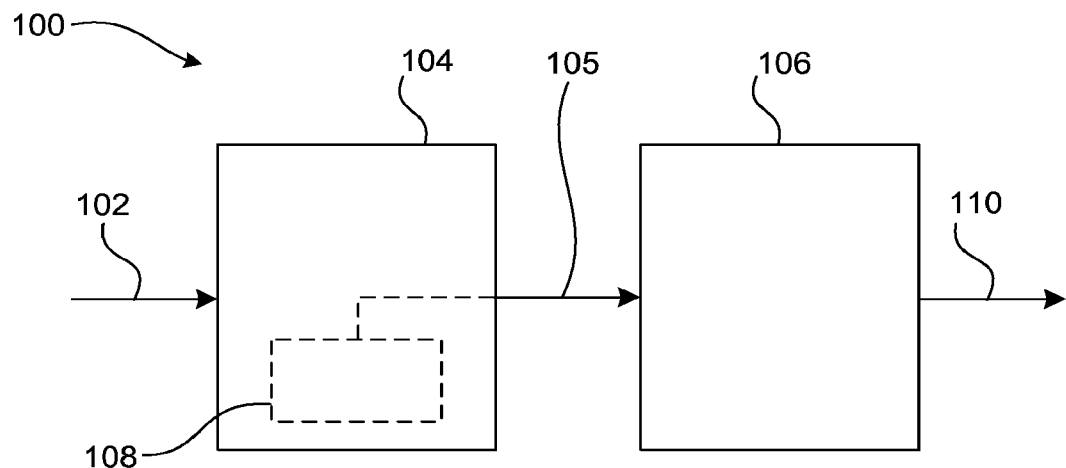
FIG. 1 is a block diagram of components for an audio filter system, according to one embodiment of the present arrangements.

The present arrangements provide novel system and methods for transmitting audio filter settings from a client device to an audio output device. Furthermore, the present arrangements provide novel systems and methods for applying audio filter settings to audio data on an audio output device. FIG. 1 shows a schematic of the components and information flow in an audio filter system 100, according to one embodiment of the present arrangements. Audio filter system includes a client device 104 and an output device 106, both of which include digital and/or analogue electronic components for receiving and transmitting an audio signal through audio output 110. As shown in FIG. 1, client device includes an audio filter input 102, audio data input 108, and an output 105.

Various embodiments include data in various formats. It is to be understood that the information, such as filter settings or audio information may be used or stored in formats that effectively contain the same or similar information. Thus, for example, audio may be provided over digital networks in packets of information by using audio coding formats, such as by the MP3, AAC and FLAC standards.

Alternatively, audio information may be provided by a signal that varies in time such as would be used to drive speakers—this type of format is referred to herein, without limitation, as a "continuous signal," or a "time-varying signal." Time-varying signals may either utilize discrete signal levels (as would be obtained from an A/D converter), or could be a non-discrete signal. In addition, the filter information described herein is generally stored and used as numerical values that are used with digital filters. Certain embodiments described herein convert the filter information into a time-varying signal so that it may be transmitted along with time-varying audio signals.

In operation, client device 104 receives audio filter settings at audio filter input 102 and receives, or has stored in memory, audio data in an audio coding format at audio data input 108. Client device 104 then transmits audio filter settings and to output device 106 at output 112. In some instances, audio data input 108 is located on client device 104. As audio data passes through audio output device 106, audio filter settings modify the audio data and generate a continuous (that is, time-varying) audio signal at audio output device 106.

The audio filter settings, received at audio filter input 102, may be received in any arrangement that enables the audio filter setting to manipulate audio data. By way of example, a biquad audio filter may be used to modify an audio signal by adjusting four variables: frequency or frequency range (which may exist as a band defined by an upper limit frequency and a lower limit frequency), Q-factor, gain and additional settings. Audio filter settings may include any number of frequency or frequency bands, with each frequency or frequency range with adjustable variables. Preferably, audio filter settings include 16 frequencies or range of frequencies.

For each selected frequency or frequency range, gain (usually measured in decibel (dB)) may be set to a desired value. In other words, decibel level may be either increased or decreased to produce a desired sound. As a result, the increase or decrease of decibels of each frequency or frequency range alters the acoustic sound of audio data. In addition to gain and frequency, a Q-factor may also be adjusted to control how many frequencies around a frequency or frequency range will be affected. Additional settings may also be modified to adjust variables of an audio filter. For example, the audio filter may include a peak filter or shelf filter to adjust the values of each frequency or each frequency range within the audio filter. In another embodiment, audio output device 106 may have a dual driver configuration (e.g., dual driver headphones). In this embodiment, audio filter setting parameters may also include settings that determine the frequency at which the low frequency driver stops playing and a high frequency driver starts to play.

In addition, audio filter settings may also include metadata that provides information about the filter file. For example, metadata may include information about the filter such as the filter type and audio filter settings. Metadata may also include information regarding the type of audio data that should be filtered such as genre, artist, song and album.

Those skilled in the art will understand that audio filter settings may be in any format so long as the format provides the settings attributed to that audio filter. In one embodiment, the format of the audio filter settings received at audio filter input 102 is a binary file format (e.g., a bit stream). In another embodiment, the audio filter settings are converted to a time-varying signal for transmission to audio filter input 102.

In one embodiment, audio filter settings are provided to client device 104, as shown in FIG. 1. The present invention contemplates numerous ways of receiving audio filter settings that does not originate from client device 104. For example, the audio filter settings may be downloaded from a host server, website or cloud storage. Similarly, it may be transferred from another device such as a computer or laptop via a cable or wirelessly.

In an alternative embodiment, the audio filter settings may originate from client device 104. By way of example, client device 104 may include a graphic equalizer or a software facsimile of a graphic equalizer. In this manner, a user may manually alter the dB level for each frequency or frequency range using the client device to create different audio filter settings. In another example, client device 104 may include a memory component from which one or more audio filter settings may be stored and retrieved as necessary.

Client device 104 may be any device capable of receiving audio filter settings and transmitting audio filter settings to audio output device 106. Examples of client device 102 may include portable audio players, laptops, smartphones, tablets, home audio systems, computers, soundboards and vehicle audio systems. In certain embodiments of the present arrangements, client device 104 is capable of transmitting audio data in addition to transmitting audio filter settings.

Audio output device 106 may be any device capable of receiving audio filter settings from client device 104 and applying audio filter settings to audio data. By way of example, audio output device 106 may include headphones, headsets, home audio speakers, portable speakers, car speakers, instrument amplifiers and/or any component that is communicatively coupled to an audio output device such as a gather, wire and headphone cable.

In certain embodiments, audio output device 106 is capable of receiving audio filter settings and audio data in a binary file format. In one embodiment of the present arrangement, therefore, audio filter system 100 is configured to receive and transmit binary files. However in other embodiments, audio output device 106 can only receive audio filter settings using a time-varying signal. In another embodiment of the present arrangements, audio filter system 100 is configured to receive and transmit time-varying signal files.

Figure 2:
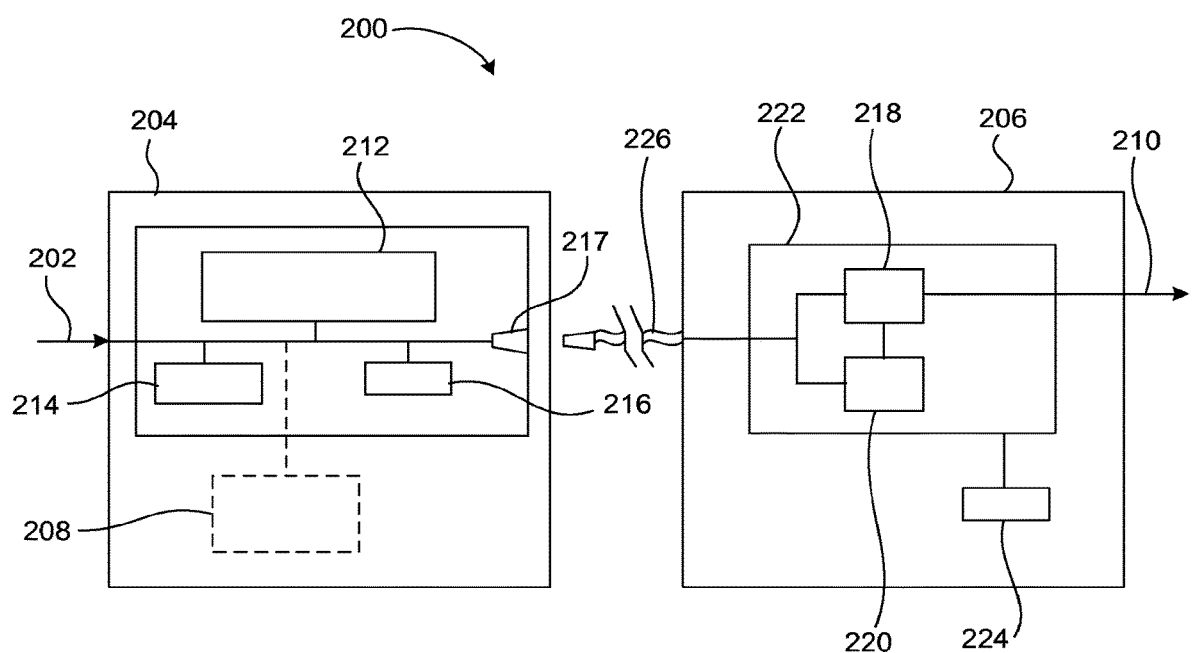
FIG. 2 is a block diagram of an audio filter system, according to another embodiment of the present arrangements, which transmits a time-varying signal between a client device and an audio output device.

FIG. 2 shows an audio filter system 200, according to one embodiment of the present arrangements and that uses a time-varying signal to transfer audio filter settings and audio data. Audio filter system 200, which is substantially similar to audio filter system 100, includes a client device 204 having an audio filter input 202, and an audio output device 206 having an audio output 210, which are substantially similar to client device 104 having audio filter input 102, and audio output device 106 having audio output 110, respectively, from FIG. 1. In the embodiment of FIG. 2, client device 204 specifically converts audio filter settings to audio filter signal settings in a time-varying signal format (hereinafter an "audio filter signal"). Similarly, client device 204 also converts audio data to audio data in a time-varying signal format (hereinafter an "audio signal"). Both audio filter signals and audio data signals may then be transmitted through a cable that supports a time-varying signal format.

Client device 204 includes an audio filter input 202, an audio data input 208, a processor 212, memory 214, a digital to analog converter (hereinafter "D/A converter") 216 and audio plug 217. Client device 204 is separate from and in communication with audio output device 206, which includes an audio cable 226, a printed circuit board 222, a codec 218, a DSP 220, memory 224 and a continuous audio output 210.

Processor 212, of client device 204, executes computer instructions for controlling and manipulating audio filters settings. In certain embodiments processor 212 may instruct digital to analog converter 216 to convert the audio filter settings to an audio filter signal. That is, the digital information contained in the audio filter settings is converted into a time-varying signal format. As described subsequently, this step allows the filter and audio information to be transmitted along the same time-varying signal communications link.

The following is one example of the conversion of digital filter setting to a time-varying signal as the conversion of a biquad filter from a binary file to an audio filter signal: For a biquad filter, each frequency or frequency band of the filter includes four parameters: frequency, Q, gain and additional settings. The use of such parameters for filtering audio is well known in the field. The conversion of these settings into a time-varying signal that may be used by audio output device 206 proceeds as follows.

First, the parameters are assigned a certain size (that is, number of bits).

Frequency: The frequency is represented by a 16 bit number, which may be, for example, between 25 and 20,000 Hz.

Q: The parameter Q is represented by 4 most significant bits (herein after "MSB") representing the integer and the 4 least significant bits (hereinafter "LSB") representing the decimal portion. Preferably, both integer and decimal should be between about 0 and about 16.

Gain: Gain is represented by 9 bits, where the MSB is the sign bit, with a 0 for positive and 1 for negative. The following 8 bits represent the Gain value. The next 4 MSB are integer and the final 4 LSB are decimal. The integer and decimal should range between about 0 and about 16.

Settings: 15 bits are reserved for setting variables. In an array of 16 filters, for example, the first 4 bits are 4 MSB, representing the index of the filter band. The index of the filter is determined by the following formula: 2048*x, where x is index. Therefore, index 0 is 0, index 1 is 2048, index 2 is 4096, etc. The remaining 11 bits are all 0.

The parameters are then assembled in an array that is 48 bits long comprising, in order, 16 bits representing frequency, 8 bits representing Q, 9 bits representing gain, and 15 bits representing settings.

The binary array with a length of 48 bits may is next encoded, for example and without limitation, using Manchester encoding, also known as phase encoding, or PE, and described, for example, in IEEE 802.3. In Manchester encoding, each bit is transmitted in a fixed time (the "period"), and the data (0's and 1's) are expressed by a transition value (0's are a high-to-low transition of 1 to 0, and 1's are a low-to-high transition of 0 to 1. Continuing with the present example, each 1 in the 48 bit binary array is replaced with a 0,1, and each 0 is replaced with a 1,0. Following the Manchester encoding process, a specific header and a footer is attached to the encoded binary array. The specific header and footer distinguish the audio filter settings from audio arrays when they are processed by DSP 220 on audio output device 206.

The unique encoded array header is made up of fifty 0's in row and then ten 1's in a row. This header should precede every filter band. The encoded array footer is made up of thirty alternating 0's and 1's and should be placed after the very last filter band that is going to be transmitted. If only one band is sent, it goes after that one band. If 16 bands are sent, the footer follows the 16th band. For example: A biquad filter with a frequency of 250, Q of 2.1, Gain of 1.0 and Settings of 4096, which is in an index of 2 is encoded as follows:

Header:
Fifty 0's: [0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0]
Ten 1's: [1, 1, 1, 1, 1, 1, 1, 1, 1, 1]
Data:
Before Manchester Encoding: [0, 0, 0, 0, 0, 0, 0, 1, 1, 1, 1, 1, 0, 1, 0, 0, 0, 1, 0, 0, 0, 0, 1, 0, 0, 0, 0, 1, 0, 0, 0, 0, 0, 0, 1, 0, 0, 0, 0, 0, 0, 0, 0, 0, 0, 0, 0, 0]
After Manchester Encoding: [1, 0, 1, 0, 1, 0, 1, 0, 1, 0, 1, 0, 1, 0, 1, 0, 0, 1, 0, 1, 0, 1, 0, 1, 1, 0, 0, 1, 1, 1, 0, 1, 0, 1, 0, 0, 1, 1, 0, 1, 0, 1, 0, 1, 1, 0, 0, 1, 1, 0, 1, 0, 1, 0, 0, 1, 1, 0, 1, 0, 1, 0, 1, 1, 0, 0, 1, 1, 0, 1, 0, 1, 0, 1, 0, 1, 0, 1, 0, 1, 0, 1, 0, 1, 0, 1, 0, 1, 0, 1, 0, 1, 0, 1, 0]
Footer:
Thirty alternating 0's and 1's: [0, 1, 0, 1, 0, 1, 0, 1, 0, 1, 0, 1, 0, 1, 0, 1, 0, 1, 0, 1, 0, 1, 0, 1, 0, 1, 0, 1, 0, 1]
Fifty 0's: [0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0]
Combined Array:
[0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 1, 1, 1, 1, 1, 1, 1, 1, 1, 1, 1, 0, 1, 0, 1, 0, 1, 0, 1, 0, 1, 0, 1, 0, 1, 0, 1, 0, 1, 0, 1, 0, 0, 1, 1, 0, 1, 0, 1, 0, 1, 0, 1, 0, 1, 0, 1, 0, 1, 0, 0, 1, 1, 0, 1, 0, 1, 0, 1, 0, 1, 0, 1, 0, 1, 0, 1, 0, 1, 0, 0, 1, 1, 0, 1, 0, 1, 0, 1, 0, 1, 0, 1, 0, 1, 0, 1, 0, 1, 0, 1, 0, 1, 0, 1, 0, 1, 0, 0, 1, 0, 1, 0, 1, 0, 1, 0, 1, 0, 1, 0, 1, 0, 1, 0, 1, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0]

Following encoding and the addition of a header and a footer, the encoded binary data may be converted to a time-varying signal. The binary data is converted into two time-varying signals by creating two sine waves. Each 1 in the binary data forms a sine wave at a frequency of 1200 Hz and has an equation of $f(t)=\sin(2*pi*1200*t)$. Each 0 in the binary data forms a sine wave at a frequency of 2400 Hz and has an equation of $f(t)=\sin(2*pi*2400*t)$. For each equation:

t will range from 0 to the Duration of the signal by a step size of 1.0/sample rate.

Sample rate=48000

Duration=(number of binary data points)/(bits per second)

A/D converter 216 saves the audio filter signal (e.g., a .wav file) to memory 214. The audio filter signal may then be transferred to audio output device 206. Preferably, audio filter signal is transmitted over the right channel only and the left channel is all 0's.

In some instances, audio data input 208 may be in communication with client device, however, in other instances there is not communication between audio data input and client device 204. In one embodiment of the present arrangements, audio data is stored in memory 214. To transmit the audio data, audio input device 208 retrieves audio data from memory 214 and transmits it to audio output device 206. If necessary, D/A converter 216 may convert the audio data to an audio signal before it is transmitted to audio output device 210. In another configuration of the present arrangements, audio data input 208 is not part of client device 204 but is in communication with client device 204. Audio data input 208 may retrieve audio data from any component capable of transmitting data such as another client device, another audio output device, an audio player, server or website. Audio data may be transmitted through a cable or wirelessly.

Meanwhile, in another example of the present arrangements, audio output device 208 is separate from and does not communicate with client device 204. Audio data input 208 transmits audio data directly to audio output device 206 and separately client device 204 transmits audio filter settings to audio output device 206.

Memory 214 may store one or more audio filter settings and/or one or more audio data files. In certain circumstances, memory 214 may be a primary memory (e.g., random-access memory), which temporarily saves the audio filter settings while processor 212 executes a function. Memory 214 may also be a secondary memory component (e.g., flash memory, internal or external hard disk drives and internal or external solid state drives), which permanently or semi-permanently saves the audio filter settings, and is in communication with processor 212.

In an alternate example, processor 212 is configured to analyze information stored within audio data, such as descriptive metadata, which then selects the appropriate audio filter settings. For example, when a user selects a classical song by Mozart, processor 212 retrieves descriptive metadata from the music data. Processor 212 may then search the metadata of one or more audio filter setting stored in memory 214. If processor 212 finds a match, for example, the metadata may include the genre as classical music or Mozart as the artist, and the processor may transmit the appropriate audio filter settings to an audio output device 206. In this manner, the audio filter system 200 may transmit audio filter settings to audio output device 206 automatically, based on the audio data that is being played in the audio player. In different criteria, processor 212 may transmit the metadata to a remote database to identify a match and then return a result.

In yet another embodiment of the present arrangements, processor 212 may be configured to generate an acoustic fingerprint of audio data received at audio data input 208. An acoustic fingerprint is an analysis of the acoustic properties of the audio itself. Processor 212 may then compare the acoustic fingerprint against an acoustic library or database to identify the audio data that matches the acoustic fingerprint. The acoustic library is thus stored in memory 214. Alternatively, processor 212 may transmit the acoustic fingerprint to a remote database to identify a match and return a result. Processor 212 may then retrieve the audio filter setting that matches the audio data and automatically transmit audio filter settings to audio output device 206.

In one embodiment, an audio filter signal and audio signal may be transmitted simultaneously from client device through an audio plug 217. In another embodiment, audio filter signal and audio signal are transferred sequentially. Preferably, audio plug 217 is a 3.5 mm plug, which is common in many client devices that transmit time-varying signals. Audio output device 206 may use an audio cable 226 to couple audio output device 206 and audio plug 217. In this way, audio output device 206 receives an audio filter signal from client device 204

The audio filter signal and audio signal received from analog cable 226 are transmitted simultaneously to DSP 220 and codec 212, each located on printed circuit board assembly 222. Meanwhile, DSP 220 digitizes the audio filter signal and audio signals (e.g., converts audio filter signal and audio signal to binary arrays) using DSP 220's onboard analog to digital converter. As the binary arrays stream through DSP 220, it detects audio filter setting headers and footers. If DSP 220 detects an audio filter setting header and footer, DSP 220 extracts audio filter settings, including headers and footers, from the binary arrays. DSP 220 or a microcontroller in communication with DSP 220 decodes the audio filter settings and removes the headers and footers. Thus, for example, by decoding the Manchester encoded audio filter settings and removing the headers and footers. The result is audio filter settings in a binary format. The onboard equalizer is adjusted to the defined parameters of the audio filter settings (e.g., frequency or frequency bands, Q, gain and additional settings) to create an audio filter. DSP 220 may also transmit audio filter settings to memory 224.

The audio filter signal and audio signal transmitted to codec 218 are also digitized back binary arrays. As the binary arrays pass through codec 218, the DSP's onboard equalizer modifies the audio data binary array, such that the audio filter settings are applied to the audio data. Codec 218 then converts the modified audio data binary array back to a time-varying audio signal. Finally, codec 218 transmits the time-varying audio signal to continuous audio output 210. The modified audio data may then be heard through an audio producing device (e.g., a speaker).

Audio filter settings stored on memory 224 may remain on audio output device until audio filter settings are erased or a new audio filters settings are received from client device 204. However, in another embodiment of the present arrangements, multiple audio filter settings may be stored on memory 224. A user may select audio filters settings, stored on audio output device 206, depending on the audio data audio received by output device 206. Selecting an audio filter setting may be performed by various means (e.g., turning a knob or selecting a filter displayed on a screen).

In yet another configuration, audio output device 206 is capable of determining properties of an audio file and selecting appropriate audio filter settings for the audio file. As such, audio output device 204 may read the descriptive metadata of the audio data received from audio data input 208. Based on the descriptive metadata, audio output device 206 may select audio filter settings, stored on audio output device 206, that matches the descriptive metadata. In this aspect, a user may be allowed to use his or her audio output device 206 when it is not connected to the client device 204 and continue to be able to enjoy an audio filtered experience. By way of example, a user may transfer audio filter settings from client device 204, such as a tablet computer, to the user's audio output device 206 such as headphones. The headphones may store multiple audio filter settings. The user may disengage the headphones from the tablet computer and then attach the headphones to a second device such as a smart phone. If the user plays audio data from the smart phone, headphones may read metadata received from the audio data and select an appropriate audio filter setting. The user may then enjoy audio filter settings without a connection to a tablet computer.

Figure 3:
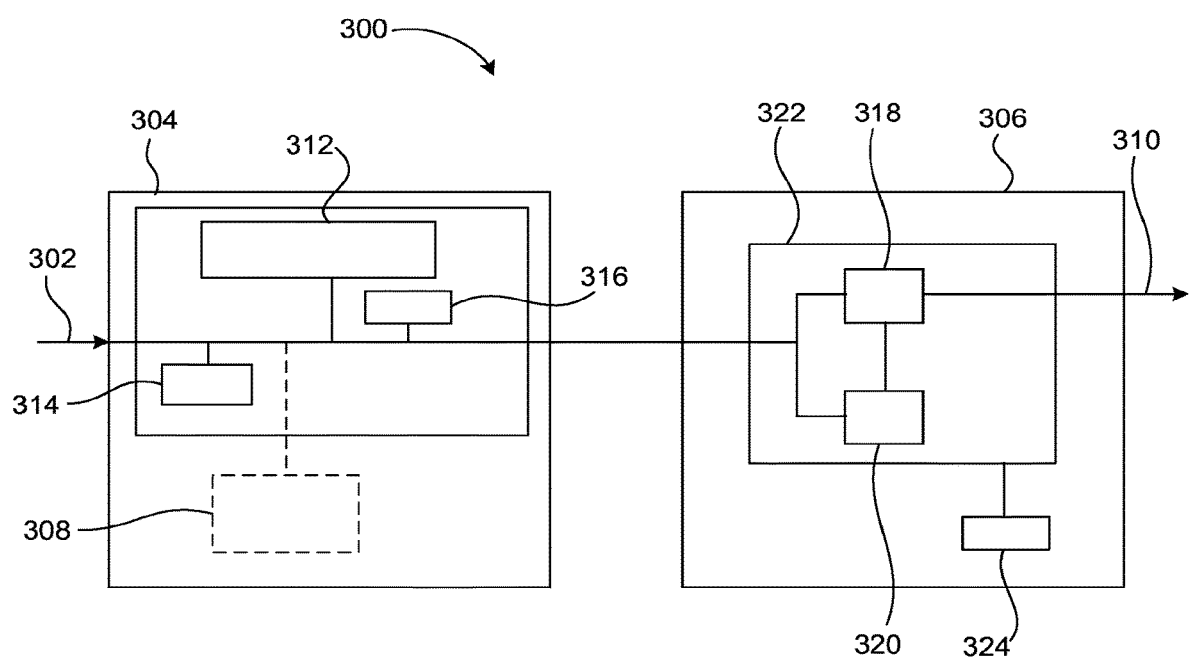
FIG. 3 is a schematic of an audio output device, according to one embodiment of the present arrangements.

FIG. 3 shows an audio filter system 300, according to another embodiment of the present arrangements. Audio filter system 300 is substantially similar to audio filter system 200, except converting audio filter settings to an audio filter signal and converting audio data to an audio signal are not required. Instead, audio filter system 300 uses a binary file format to transfer audio filter settings and audio data. Thus, audio filter settings and audio data may be transmitted from client device 304 directly to audio output device 306.

Client device 304, which includes audio filter input 302, audio data input 308, processor 312, and memory 314 is substantially similar to client device 204, audio filter input 202, audio data input 208, processor 212, memory 214 of FIG. 2. Client device 304, however, replaces D/A converter 216 of FIG. 2 with an encoder 340. Encoder 340 modifies a binary file before it is transmitted to audio output device 306. Audio output device 306, which includes codec 318, DSP 320, PCB 322, memory 324 and continuous audio output 310 is substantially similar to audio output device 206, codec 218, DSP 220, PCB 222, memory 224 of FIG. 2.

One skilled in the art of audio engineering will recognize that there are many means of transferring a binary file. For example, binary files may be transferred to audio output device 306 wirelessly (e.g., BLUETOOTH®, near field communication or Wi-Fi) or through a cable (e.g., USB or FIREWIRE®). Regardless of transfer technique, the process of transmitting a binary file from client device 304 to audio output device 306 are similar. Audio filter settings, received from audio filter input 302 or memory 314, are encoded with a header and footer at encoder 340. The unique array of 1's and 0's in the header and footer allow DSP 320 to identify the binary array as audio filter settings.

In one embodiment of the present arrangements, the encoded audio filter settings and audio data are transmitted to audio output device 306 simultaneously. In another embodiment, audio filter signal and audio signal are transferred sequentially. Regardless of the transmission sequence, the data arrays are transmitted to DSP 320 and codec 318. DSP 320 monitors the incoming binary arrays to detect a header and footer. When DSP 320 detects the header and footer, DSP 320 extracts the audio filter settings and transfers the settings to an onboard audio equalizer on DSP 320. The audio data array received by codec 318 is modified according to audio filter settings of the DSP's onboard equalizer. The modified audio array is then converted to a time-varying signal before it is transmitted to continuous audio output 310.

Where binary arrays are transmitted wirelessly, wireless hardware may use different transmission profiles to transmit audio filter settings and audio data. By way of example, if BLUETOOTH® is used to transfer binary data, audio filter settings may be transmitted from client device 304 using an FTP profile, while the audio data may be transferred using an A2DP profile. BLUETOOTH® hardware on audio output device 306 may receive the audio filters settings, extracts audio filter settings from the FTP profile. The audio filter settings are then transmitted to DSP 320 and codec 318. Similarly, audio data is extracted from the A2DP profile and transmitted to DSP 320 and codec 318.

Figure 4:
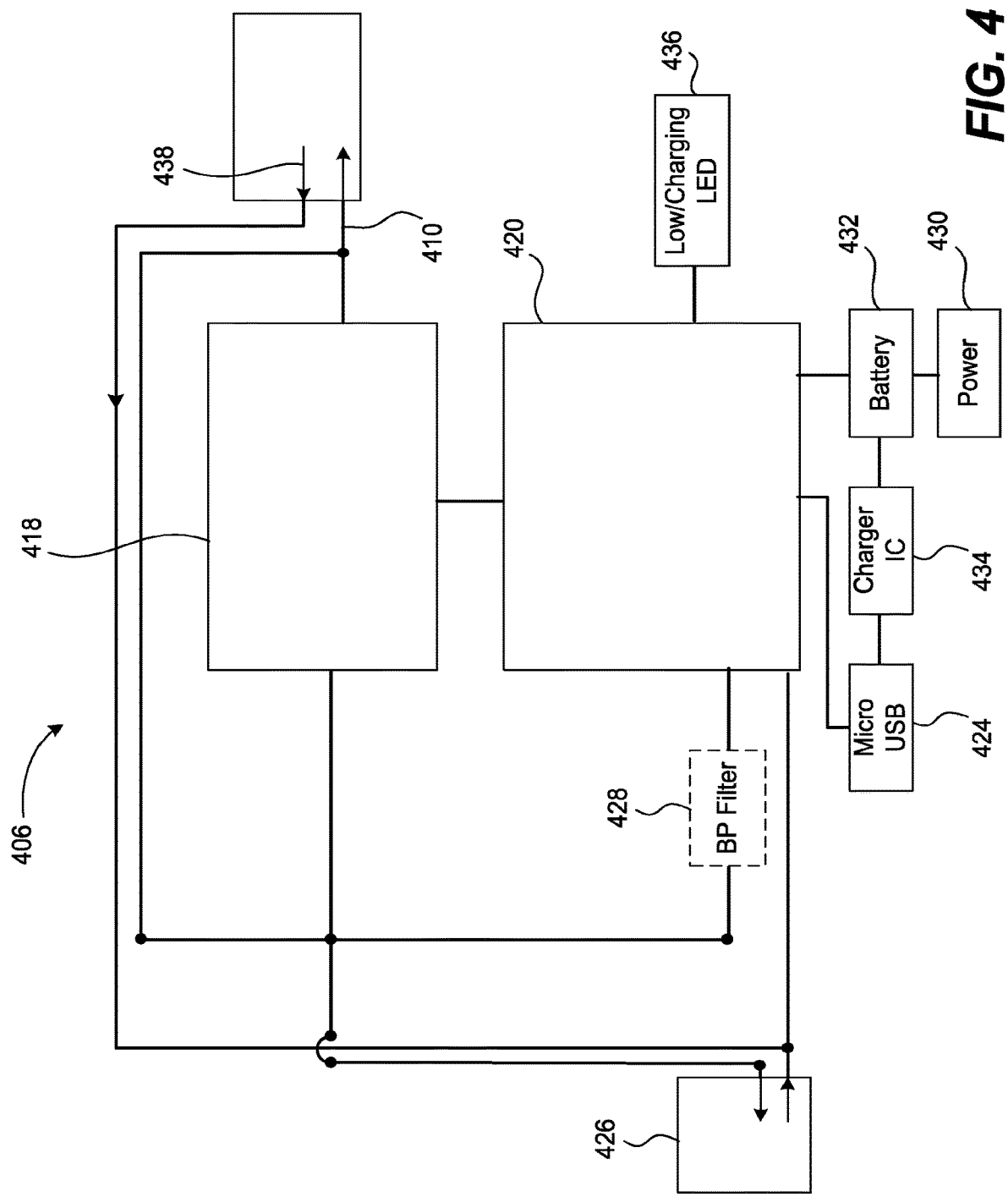
FIG. 4 is a process flow diagram for a method, according to one embodiment of the present arrangements that transmits binary data between a client device and an audio output device.

FIG. 4 shows a schematic of audio output device 406, according to one embodiment of the present arrangements. Audio output device 406, which is substantially similar to audio output devices 206 of FIG. 2 and 306 of FIG. 3, includes a DSP 420, a codec 418 and a continuous audio output 410. In this embodiment, DSP 420 is coupled to a bandpass filter 428, which removes frequency ranges in a time-varying signal before DSP 420 analyzes the signal. By way of example, the bandpass filter may remove all the time-varying signal frequencies that are not within the range of an audio filter signal. If the audio filter signals have a sine wave of 2,400 Hz and 1,200 Hz respectively, a bandpass filter of 1,000 Hz to 2,400 Hz will remove all time-varying frequencies that are not in the bandpass filter range. DSP 420, using Manchester decoding, then converts the time-varying signal between 1,000 Hz to 2,400 Hz to binary arrays. DSP 420 may then examine a smaller signal range to locate an audio filter signal.

Audio output device 406 also includes micro USB 424, power 430, battery 432, charger IC 434 and low/charging LED 436 which are separate from and in communication with DSP 420. Battery 432 is also in communication with power 430. Audio output device 406 also includes microphone input 436 which transmits time-varying signal from audio output device 406 to a client device 426.

Figure 5:
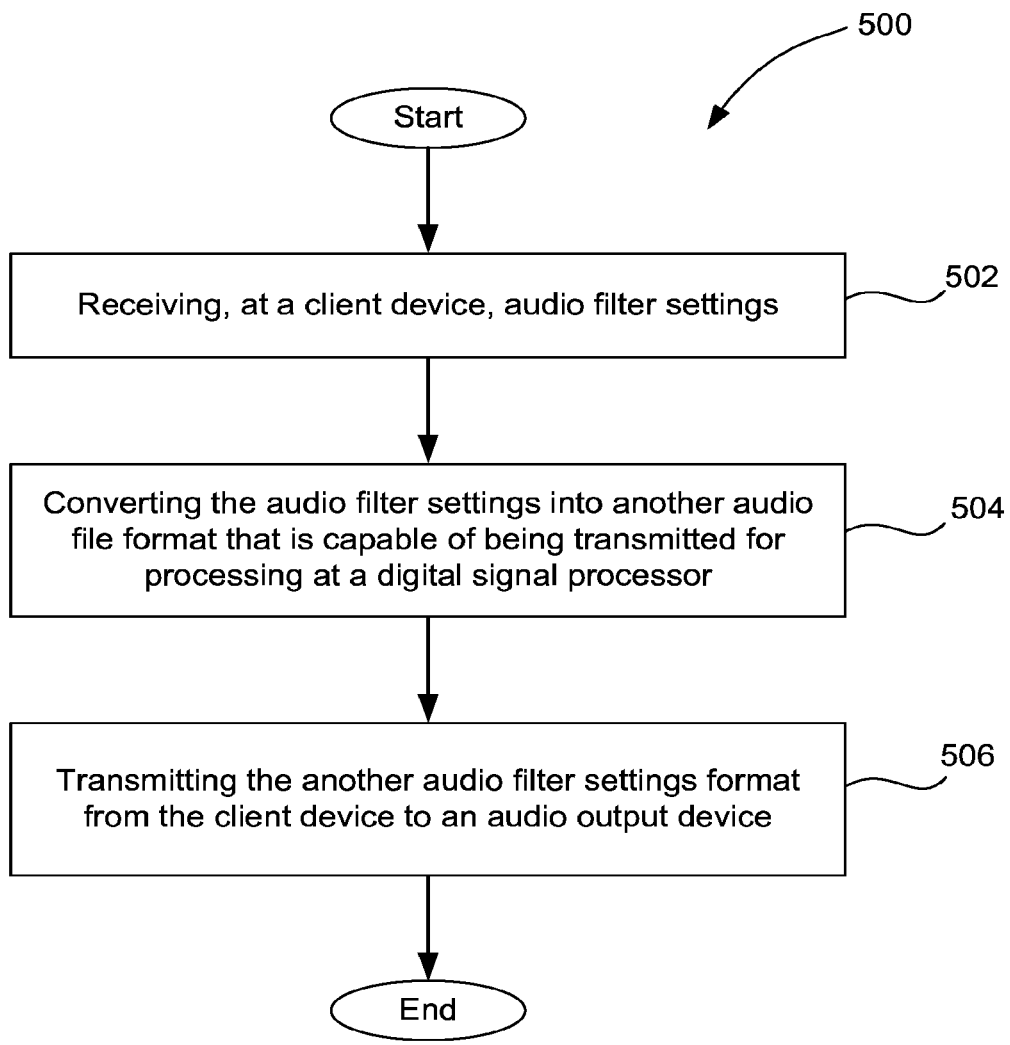
FIG. 5 is a process flow diagram for a method, according to one embodiment of the present teachings, for transmitting audio filter settings from a client device to an audio output.

The present teachings also offer novel methods of transmitting audio filter settings using an audio filter system (e.g., audio filter system 100 of FIG. 1). FIG. 5 shows a method 500, according to one embodiment of the present teachings, for transmitting audio filter settings from a client device to an audio output device. Method 500 preferably begins with a step 502, which includes receiving, at a client device, audio filter setting providing settings of a frequency distribution and Q, gain, and additional setting associated therewith. The received file may be digital or analog. However, the present invention is not limited to a particular file type, so long as the file provides frequency settings distribution and Q, gain and additional setting associated with each frequency setting.

In one embodiment, audio filter settings may be received from a source on the client device. A dB response for selected frequencies may be created using a client device's graphic equalizer or a software facsimile of a graphic equalizer. In this manner, a user may manually alter the dB level for each frequency or frequency range to create audio filter settings. The client device may include memory component from which one or more audio filters settings may be stored and retrieved when necessary.

The present invention contemplates any manner of receiving audio filter settings, including those that do not originate on the client device. For example, the file may be downloaded from a host server or a website. Similarly, it may be downloaded from another device such as a computer or laptop via a cable or wirelessly.

Next, a step 504 includes converting the audio filter settings into another file format that is capable of being transmitted for processing at a DSP, which is designed to modify audio data based on settings of the file. In one embodiment, transmission between a client device and an audio output device can only be made using a time-varying signal. If the audio filter settings received at step 502 is a binary file, an encoder converts the binary file to a time-varying signal format, which contains the same audio filter settings as the binary file. Using the time-varying signal format, the audio filter settings may be transmitted to the DSP on the audio output device.

A step 506 includes transmitting the another audio filter settings format, from client device to an audio output device. The file format is such that it is ultimately provided to the DSP, which modifies the audio file. The another audio filter settings format may be transferred from the client device to an audio output device in any suitable manner.

In one embodiment, the another audio filter settings format is transmitted as a time-varying signal. For example, a 3.5 mm audio plug on the client device may be coupled to a 3.5 mm audio cable of a client device to transmit audio filter settings that are ultimately transmitted to the DSP.

In another embodiment, the another audio filter settings format may be transmitted as a binary file format. The binary file may be transmitted in any suitable manner. In one preferred embodiment, a binary file may be transmitted by a direct connection between the client device and the audio output device such as through a data cable or wire capable of transferring a binary file. In another embodiment, a digital file may be transferred wirelessly such as by Bluetooth®, near field communication and Wi-Fi.

Figure 6:
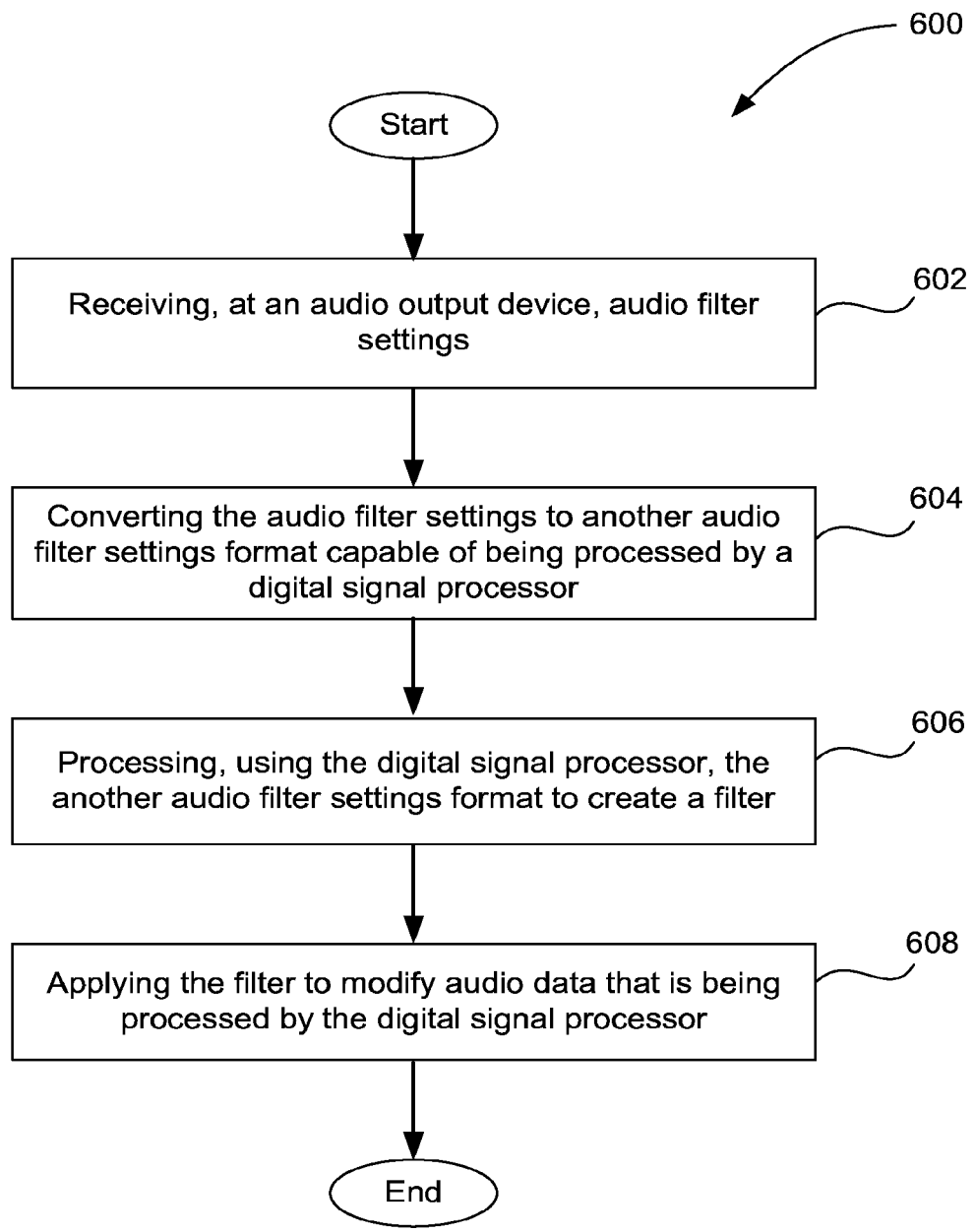
FIG. 6 is a process flow diagram for a method, according to one embodiment of the present arrangements, for applying audio filter settings to an audio file on an audio output device.

FIG. 6 shows a method 600, according to another embodiment of the present teachings, for filtering an audio signal at an audio output device (e.g., audio output device 206 of FIG. 2). Method 600 preferably begins with a step 602, which includes receiving, at an audio output device, audio filter settings format that includes information regarding frequency distribution and Q, gain and additional settings associated therewith.

The audio filter settings transmitted from a client device, as explained in step 506 of FIG. 5, and received by an audio output device may be in analog or digital form. The file may be received from the client device via a cable or wirelessly.

Next, a step 604 includes converting the audio filter settings to another audio filter settings format capable of being processed by a DSP. The format of the file received from the client device may need to be converted to a binary file, capable of being used by the audio output device's DSP. As an example, a time-varying signal may be converted to a binary file before it can be processed by the DSP. For example, a time-varying signal may be converted to a binary file using the DSP's analog to digital converter before it is processed by the DSP.

In step 606, another audio filter settings format is processed using a DSP to create a filter using settings of the frequency distribution, Q, gain and additional settings associated with the audio filter settings. The DSP modifies the DSP's onboard audio equalizer to the settings defined on binary audio filter settings. The DSP may then apply audio filter settings to audio data as it passes through the codec.

A final step 608 includes applying the filter to modify audio data that is being processed by the DSP such that the frequency distribution, Q, gain and additional settings associated therewith are applied to the audio data. As binary audio data passes through a codec on the audio output device, the audio data is processed by the DSP such that the DSP overlays the audio filter settings to the audio data. The modified audio data is converted back to a time-varying signal played out of the audio output device as a continuous audio signal.

It is to be understood that the invention includes all of the different combinations embodied herein. Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

Although illustrative embodiments of the present teachings and arrangements have been shown and described, other modifications, changes, and substitutions are intended. Accordingly, it is appropriate that the appended claims be construed broadly and in a manner consistent with the scope of the disclosure, as set forth in the following claims.

What is claimed is:

1. A client device comprising:
an input for accepting a time-varying signal including encoded audio filter settings and a time-varying audio signal, wherein encoded time audio filter settings being in binary format and includes two types of sine waves, one of which is formed based upon a value of 1 present in said binary format and another of which is formed based upon a value of 0 present in said binary format;
decoding electronics adapted to accept and decode said encoded audio filter settings;
a digital signal processor to for accepting said audio filter settings from said decoding electronics and for applying said audio filter settings to filter said time-varying audio signal to produce a filtered audio signal; and
wherein
an audio output device configured to deliver said filtered audio signal to an audio output device.

2. The client device of claim 1, wherein said client device includes computer memory, and wherein said digital signal processor is programmed to:
receive a plurality of audio filter settings,
store plurality of audio filter settings in the computer memory of the client device, and
allow selection of an audio filter setting from said plurality of audio filter settings that is conveyed to said output.

3. The client device of claim 1, wherein said time-varying audio signal is in an audio coding format.

4. The client device of claim 3, wherein said audio coding format is MP3, AAC, or FLAC.

5. The audio output device of claim 1, wherein said decoding electronics decode Manchester encoded signals.

6. The audio output device of claim 1, wherein said decoding electronics determines a header for said encoded audio filter settings.

7. The audio output device of claim 1, further comprising electronics to convert said encoded audio filter settings to a filter applied inside said digital signal processor to for filtering said time-varying audio signal.

* * * * *